United States Patent [19]
Killey

[11] Patent Number: 5,342,672
[45] Date of Patent: Aug. 30, 1994

[54] HOLOGRAPHIC THERMAL TRANSFER RIBBON

[75] Inventor: Edward J. Killey, Racine, Wis.

[73] Assignee: Weber Marking Systems, Inc., Arlington Heights, Ill.

[21] Appl. No.: 944,494

[22] Filed: Sep. 14, 1992

[51] Int. Cl.$^5$ .............................................. B32B 3/00
[52] U.S. Cl. .................................. 428/195; 400/241.1; 427/148; 428/207; 428/339; 428/447; 428/689; 428/913; 428/914
[58] Field of Search ................ 156/310; 428/200, 916, 428/484, 195, 220, 352, 354, 914, 207, 336, 338, 339, 488.1, 913; 430/18, 1; 400/240.1, 696, 697, 120, 241.1; 427/146, 148

[56] References Cited

U.S. PATENT DOCUMENTS

| | | | |
|---|---|---|---|
| 3,781,903 | 12/1973 | Jeffers et al. | 346/74 |
| 4,097,279 | 6/1978 | Whitehead | 96/27 B |
| 4,250,217 | 2/1981 | Greenaway | 428/161 |
| 4,544,441 | 10/1985 | Hartmann et al. | 156/634 |
| 4,937,171 | 6/1990 | Lamprecht et al. | 430/275 |
| 4,954,422 | 9/1990 | Lamprecht et al. | 430/275 |
| 4,987,230 | 1/1991 | Monroe | 346/94 |
| 5,011,570 | 4/1991 | Ohbayashi | 156/310 |
| 5,171,639 | 12/1992 | Mecke et al. | 428/195 |
| 5,281,499 | 1/1994 | Bussard | 430/1 |
| 5,282,066 | 1/1994 | Yu et al. | 359/3 |

FOREIGN PATENT DOCUMENTS 63-85784 4/1988 Japan.
63-137287 6/1988 Japan.

*Primary Examiner*—Patrick J. Ryan
*Assistant Examiner*—W. Krynski
*Attorney, Agent, or Firm*—Wallenstein, Wagner & Hattis, Ltd.

[57] ABSTRACT

The invention is a holographic thermal transfer ribbon for enabling the transfer of a hologram using a thermal transfer demand printer. The holographic thermal transfer ribbon comprises a holographic hot-stamp foil. This holographic hot-stamp foil has a foil layer and a heat-sealing layer. The heat-sealing layer may include a heat-sensitive adhesive. The holographic thermal transfer ribbon also includes a supplemental polymer layer overlaid upon the heat-sealing layer of the holographic hot-stamp foil.

8 Claims, 1 Drawing Sheet

HOLOGRAPHIC THERMAL TRANSFER RIBBON

TECHNICAL FIELD

This invention relates generally to a method of using a thermal transfer demand printer to effect transfer of a hologram onto a substrate. This invention also relates to the manufacture of what shall be termed a holographic thermal transfer ribbon, i.e., a ribbon which can be used with a thermal transfer demand printer to effect this transfer of a hologram onto a substrate.

BACKGROUND OF THE INVENTION

Holographic images have been placed on articles for security purposes. The need for holographic images has been increasing due to the prevalence of high-quality color copiers. Because of these high-quality color copiers, persons practiced in counterfeiting and tampering have made forged, high-quality tickets for sporting events, theater, commuter train passage and concerts. Financial loss occurs when these fraudulent tickets are sold to unwary consumers who are turned away from the gate upon detection by ticket takers, or when businesses lose revenue because of entry gained through the use of fraudulent tickets. The placing of holograms on genuine tickets or other similar substrates for use in admission discourages tampering, and makes tampering and counterfeiting more difficult and expensive, thereby reducing the financial losses to unwary consumers and businesses.

Currently, holograms are bonded to ticket blanks and other similar substrates in a heat stamping method. Particularly, holographic hot-stamp foils are obtained from commercial suppliers, including TransferPrint Foil, Inc., of East Brunswick, N.J., and Crown Roll & Leaf Company of Chicago, Ill. One side of these holographic hot-stamp foils includes a metallic layer, typically a few Angstroms thick, and the holographic image. The other side includes a heat sensitive adhesive. Preferred heat sensitive adhesives include thermoplastic polymers. This heat sensitive adhesive usually includes a filler or pigment, such as calcium carbonate or titanium dioxide, which assists in disrupting the adhesive's continuity. This disruption in continuity aids the foil in breaking along a precise edge upon transfer to the substrate.

Holograms placed onto substrates through the use of hot-stamp foils cannot be easily removed in their entireties because of the very thin and fragile nature of the foil. Part of the reason for this difficulty in removal is caused by the application conditions of the hologram onto the substrate. Particularly, the hologram is bonded to the substrate under high heat and pressure conditions. Although this technique is effective in providing a permanent, relatively tamper-proof hologram onto a substrate, the process used to apply the hologram requires specialized stamping equipment. The price of such equipment starts at around $40,000.

A further drawback of the hot-stamp technique of hologram transfer is that it employs a shaped or engraved metal slug. Each different size and image for a given hologram requires a differently shaped or engraved metal slug.

Furthermore, hot stamp foils are secured to polyester films of a thickness or gauge that does not respond adequately to the thermal transfer printer. Such foil-carrier films are generally much thicker than a thermal transfer printing ribbon. Alternatively, thermal transfer print ribbons are too thin or weak to withstand the embossing process that creates the holographic or diffractive pattern.

Accordingly, it would be desirable to devise a method of transferring a hologram onto a substrate using substantially less expensive equipment, while still providing a secure and nonremovable hologram. Moreover, it would be desirable to provide a holographic thermal transfer ribbon which enables such transfer of a hologram from a treated holographic hot-stamp foil using less expensive equipment, i.e., a thermal transfer printer.

The versatile improvement of this invention results from the employment of thermal transfer printers employing computer-generated graphics, rather than mechanical stamping slugs. Through the use of such thermal transfer printers, operators can create complex, holographic indicia. Such complex holographic indicia are more difficult to reproduce than conventionally shaped holograms and are, thus, more valuable and less susceptible to fraudulent abuse by counterfeiters.

SUMMARY OF THE INVENTION

The invention is a holographic thermal transfer ribbon for enabling the transfer of a hologram using a thermal transfer demand printer. The holographic thermal transfer ribbon comprises a holographic hot-stamp foil. This holographic hot-stamp foil has a foil layer and a heat-sealing layer. The heat-sealing layer may include a heat-sensitive adhesive. The holographic thermal transfer ribbon also includes a supplemental polymer layer overlaid upon the heat-sealing layer side of the holographic hot-stamp foil.

The supplemental polymer layer may be placed onto the holographic hot-stamp foil with a thermal transfer ribbon. Alternatively, the supplemental polymer layer may be placed onto the holographic hot-stamp foil by a gravure flexographic or Meyer rod application.

The thermoplastic polymer layer may be selected from the group including acrylics, polyesters, polyurethanes, polyethylenes, rosin tackifiers, epoxies and waxes.

The invention is also a method of transferring a hologram onto a substrate. This method comprises applying a thin coating of the thermoplastic polymer onto a discrete region of a substrate. Second, the heat-seal side of a holographic hot-stamp foil is placed in face to face relationship with the coating on the substrate. Third, the holographic hot-stamp foil and the substrate are heated in the region of the coating so that a holographic portion of the foil of the same size as the coating will be transferred onto the substrate. The transfer of the foil is effected by use of a thermal transfer demand printer.

As will be seen, the invention enables the transfer of a foil hologram onto a substrate in a variety of ways. The invention permits the use of much lower cost equipment in connection with the transfer of a hologram onto a substrate, permitting the use of a thermal transfer demand printer costing many times less than the equipment now used to place holograms on substrates. In addition, the invention permits the transfer of holograms onto a substrate through a method in which the holographic foil is coated with a polymer, or a method in which the substrate on which the hologram is to be transferred is coated with this polymer coating.

BRIEF DESCRIPTION OF THE DRAWINGS

FIG. I is a side view of a holographic thermal transfer ribbon in accordance with Example 4 of the invention, starting with a custom-made holographic hotstamp foil, the holographic hot-stamp foil having a foil layer, but without a heat-sealing layer, and in which a supplemental polymer layer is overlaid upon the heatsealing layer side of the holographic hot-stamp foil.

DETAILED DESCRIPTION OF THE PREFERRED EMBODIMENT

Figure 1:
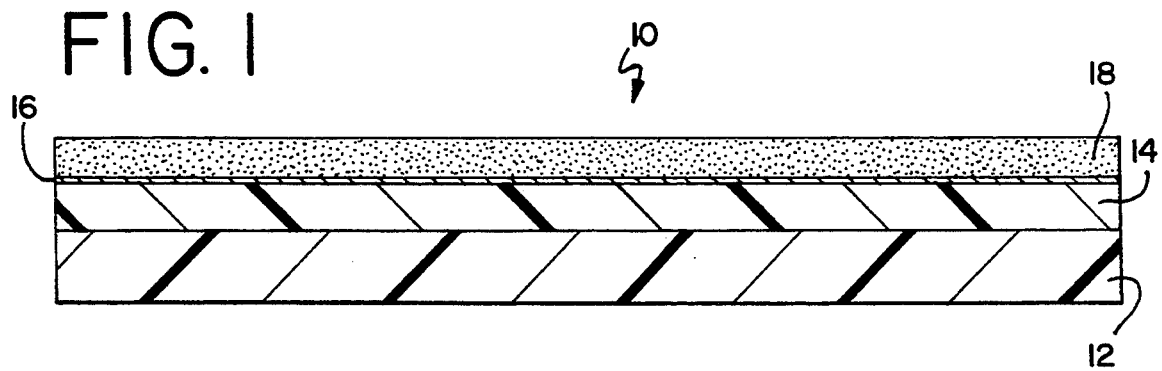

The preferred embodiments of the invention may best be understood by reference to the below-listed Examples. These Examples describe various ways of effecting the transfer of a hologram onto a substrate using a thermal transfer demand printer.

EXAMPLE 1

One method of creating a holographic thermal transfer ribbon uses a standard thermal ribbon and a holographic hot-stamp foil. The standard thermal ribbon is sold by Japan Pulp & Paper as Catalog No. JP Resin 2-Green. The holographic foil is commercially available from TransferPrint Foil, Inc., East Brunswick, N.J. 08816, as Catalog No. CF100-000-701, and from Crown Roll & Leaf, Chicago, Ill. It should be noted that the above-referenced holographic foil from TransferPrint Foil has a certain holographic image. If other holographic images are desired, comparable films having those other images are also available.

For the purposes of this invention, "holographic foil" is a gold-colored, silver-colored or other shiny-colored article having an extremely thin metal layer, and includes a holographic image on its obverse side. This obverse side shall be called the "foil layer." The holographic foil may also have a thin layer of heat-sensitive adhesive on its reverse side. Although the holographic foils are typically sold with a heat-sensitive adhesive on the reverse side, a holographic foil without this adhesive may be customordered. For the purposes of this invention, the reverse side of a holographic foil shall be called the "heat-sealing layer side," whether it is a standard foil with this adhesive or a custom foil without this adhesive.

The manufacture of the product in accordance with the invention can be made on a ZEBRA-130 Thermal Transfer Demand Printer available from Zebra Technologies Corporation, 333 Corporate Woods Parkway, Vernon Hills, Ill. 60061. Hereinafter, this printer will be referred to as the ZEBRA-130 printer.

The holographic hot-stamp foil is typically available in rolls. A roll of the holographic hot-stamp foil is placed on the lower, or substrate, capstan and threaded through the thermal head of the ZEBRA-130 printer, with the heat-sealing side of the foil facing up. More particularly, the heat-sealing side of the holographic hot-stamp foil is placed in the ZEBRA-130 printer in the same position as label stock that would be made ready for printing.

A standard, colored thermal transfer ribbon is then placed on the upper, or ribbon, capstan. The transfer ribbon is threaded through the print head as if one were to use that transfer ribbon to print upon a substrate or label stock. The thermal transfer ribbon includes a shiny film side and a dull print/adhesive side. The dull side of the thermal transfer ribbon faces the heat-sealing side of the holographic hot-stamp foil. In this way, the print/adhesive layer of the thermal transfer ribbon is in a position to be transferred onto the heat-sealing side of the holographic hot-stamp foil.

After the print head is closed to securely hold the holographic hot-stamp foil onto the standard, colored thermal transfer ribbon, the ZEBRA-130 printer controls are set at the thermal transfer mode. This is necessary, in that the hotter, direct transfer mode setting of the ZEBRA-130 printer would provide excessive heat to the thermal transfer ribbon, causing that ribbon to deform or even melt. Moreover, the direct transfer mode setting is unnecessary, as this operation does not use or depend upon a heat sensitive paper substrate.

The burn temperature controls of the ZEBRA-130 printer are set to a level optimal for the particular thermal transfer ribbon being used. This optimal level can be readily determined by trial and error. Specifically, the optimal burn temperature is that temperature which results in a complete, or nearly complete, transfer of print/adhesive from the thermal transfer ribbon to the holographic foil. If the burn temperature is not sufficiently hot, large portions of the adhesive will not be transferred. If the temperature is too hot, the transferred adhesive will be applied in a distorted, nonsmooth manner, and portions of the media or substrate underlying the print/adhesive on the thermal transfer ribbon may itself be transferred.

It is desired that the entire reverse, or heatsealing, side of the holographic foil be covered with the print/adhesive from the adjacent thermal transfer ribbon. It should be remembered that the thermal transfer ribbon is positioned in the ZEBRA-130 printer in the same manner as that ribbon would be positioned for direct printing onto a substrate or label stock. Printing onto label stock is effected by computer, including software providing the ability to print any desired indicia, such as letters, numbers or graphics. Weber Marking Systems, Inc., Arlington Heights, Ill., the assignee of the present invention, provides suitable software for use with its LEGITRONIC® graphics computers.

The software may be programmed to leave a rectangular pattern of adhesive on the heat-sealing side of the holographic foil. The software enables this rectangular pattern to be repeated, resulting in a pattern that essentially comprises one continuous band or strip on the heat-sealing side of the holographic foil. This operation completes the formation of the holographic thermal transfer foil in accordance with one aspect of the invention. Both the prepared holographic thermal transfer foil and the spent thermal transfer ribbon are now removed from the ZEBRA-130 printer.

To secure a hologram onto a substrate, the completed holographic thermal transfer foil is placed on the upper, or ribbon, capstan of this same ZEBRA-130 printer. The substrate on which the hologram is to be placed is secured to the lower, or substrate, capstan. The heat-sealing side of the foil, which now includes the adhesive from the thermal transfer ribbon, is positioned to face the substrate. The printer head is closed.

The holographic thermal transfer foil has been thickened by the addition of a layer of print/adhesive from the thermal transfer ribbon. In addition, the foil and its inherent carrier film are also somewhat heat resistant. As a result, the ZEBRA-130 printer controls are set to a hotter setting, i.e., the direct transfer mode.

There is no generalized rule for determining a proper burn temperature. This is because the proper burn temperature depends upon the natures and thicknesses of the foil and the substrate. Thus, as an experimental starting point, the burn temperature is set to a midrange level. Through observation, the printer operator can determine whether to increase or decrease the burn temperature. In particular, the burn temperature should be increased if none, or only a portion of, the hologram is transferred to the substrate. Conversely, the burn temperature should be decreased if the hologram or the foil is transferred onto the substrate, but is distorted.

When the proper burn temperature has been determined, the holograms from the holographic thermal transfer foil are printed sequentially onto the substrates. The software program includes provisions for setting desired patterns or indicia. The program also permits variations in the repeat length, i.e., the number of patterns or indicia over a given length.

EXAMPLE 2

A holographic thermal transfer ribbon may be prepared in yet another way. Rather than starting with a holographic hot-stamp foil, one may instead use a mechanically embossed carrier film having a holographic or diffractive pattern pressed into that film. An example of such a film is a polyester film sold by Spectratek, Los Angeles, Calif., as Catalog No. Holo-Sheen 0.002 inches transparent. Only one side of this film is embossed with the holographic image.

This embossed side of the polyester film may then be coated with a thin layer of a thermosetting polymer. Suitable examples of a thermosetting polymer include epoxies, melamines, alkyd silicones, U.V. acrylates, polyesters or urethane cross-linked systems. Additional examples of suitable thermosetting polymers include cross-linked acrylics or any other polymer system that will result in a coated layer which has a heat distortion temperature point above that of the polyester or other carrier film.

In order to coat the carrier film, a Meyer rod liquid-coating system, or any one of several other liquid-coating systems, may be used. The appropriate system is that which assures uniform coating weight, and will depend on the viscosity and solids content of the thermosetting polymer-coating fluid, the dimensional stability of the film to be coated, and any prior surface coatings with which that film was treated.

One suitable liquid-coating system is the direct gravure method. Here, the film to be treated is passed between an upper, relatively soft-surfaced impression roller and a lower, relatively hard-surfaced gravure cylinder. The gravure cylinder is an engraved metal roller with a fine etched pattern of holes or cells. Cells having larger diameters and depths leave a greater fluid layer than cells having smaller diameters and depths. The depth of the fluid layer may also be adjusted by changing the solids content of the liquified thermosetting polymer.

To apply the fluid layer, the liquified thermosetting polymer is placed into a container. The gravure cylinder rotates in a counterclockwise direction upon a horizontal axis. The lower portion of this cylinder is constantly immersed in the polymer and, as the cylinder rotates within the container, it picks up, i.e., becomes loaded with, fluid. Shortly after the loaded cylinder within this container rotates out of the fluid in the container, a doctor blade contacts the surface of the gravure cylinder and removes excess fluid. This action has the effect of metering the quantity of the fluid in the cells. The metered gravure cylinder contacts the moving polyester or other film in the nip area formed at the intersection of the gravure cylinder and impression roller. Then, the coated film web moves into a drying oven to remove essentially all of the solvent in the coating fluid made of this thermosetting polymer. The film web with the dried coating is then wound into a roll. As will be explained below in the Examples, including Example 3, this thermoset polymer coating is overcoated with a thermoplastic transfer adhesive.

In addition to gravure coating, flexographic coating and meyer or wire-wound rod coating methods have been used to coat polyester or other carrier films, and have also been used to coat holographic hot-stamp foils with thermoplastic polymers to create holographic thermal transfer ribbons.

Suitable coatings made from solvents and thermoplastic polymers are disclosed in subsequent Examples, and particularly in Example 3. A more detailed disclosure of this method is provided in Example 6.

EXAMPLE 3

The most preferred method of making a holographic thermal transfer ribbon in accordance with the invention is described in this Example.

In particular, the preferred thermoplastic polymer includes Epon 1001F. Epon 1001F is available from Shell Chemical. A preferred solvent for Epon 1001F is toluene. To make one suitable coating solution for the holographic hot-stamp foil, 50 percent (wt.) Epon 1001F is dissolved in 50 percent (wt.) toluene. Other suitable solutions can include between 30–50 percent Epon 1001F and 50–70 percent toluene.

This 50/50 (wt.) Epon 1001F/toluene solution may be applied to a holographic hot-stamp foil using a flexographic method. Flexographic methods, also known as offset flexoprinting, are based upon the etching of a photopolymer sheet with a gravure cylinder-like hole or cell pattern. As with gravure cylinders, the preferred etched photopolymer sheets for the preparation of this invention have line counts of 165, 180, 200 or 400 cells or lines per inch. The particular counts depend upon the viscosity and solids content of the thermoplastic polymer/solvent combination.

A most preferred thermoplastic polymer/solvent mix for coating the foil combines the Epon 1001F/toluene blend with another material to depress the melt point of the epoxy resin. A suitable material for depressing the melt point is ethylene glycol monostearate (EGMS), a waxy solid at room temperature which is soluble in alcohols and acetone. By adding EGMS to the Epon 1001F/toluene blend, the ultimately produced holographic thermal transfer ribbon can be more efficiently applied by the ZEBRA-130 or other similar printers. In particular, the Epon 1001F/toluene/EGMS coating will enable the hologram to be transferred by the ZEBRA-130 printer to the substrate at a lower burn setting. Lower burn settings are preferable in that such lower settings extend the life of the print head on the ZEBRA-130 or other similar printers.

The preferred Epon 1001F/toluene/EGMS blend for coating the holographic hot-stamp foil is made by first preparing an EGMS solution comprised of 12 percent (wt.) EGMS and 88 percent (wt.) acetone. Nine parts of the 50/50 Epon 1001F/toluene solution (based upon Epon 1001F solids weight) are added to 1 part of the above-described EGMS solution (based upon EGMS solids weight). Nine parts of solids of Epon 1001F per 1 part solid of EGMS, using the above-described solutions, will be attained by using 2.16 pounds of the 50/50 Epon 1001F/toluene solution (1.08 pounds Epon 1001F) and 1.00 pound of the 12/88 EGMS/acetone solution (0.12 pounds EGMS).

The resulting Epon 1001F/EGMS coating is applied to the holographic hot-stamp foil using an offset gravure method. The 165-screen gravure cylinder meters out the coating onto a rubber roller which, in turn, directly coats the holographic hot-stamp foil. After coating, the treated hot-stamp foil is carefully dried in an oven to remove the toluene and acetone solvents.

Figure 3:
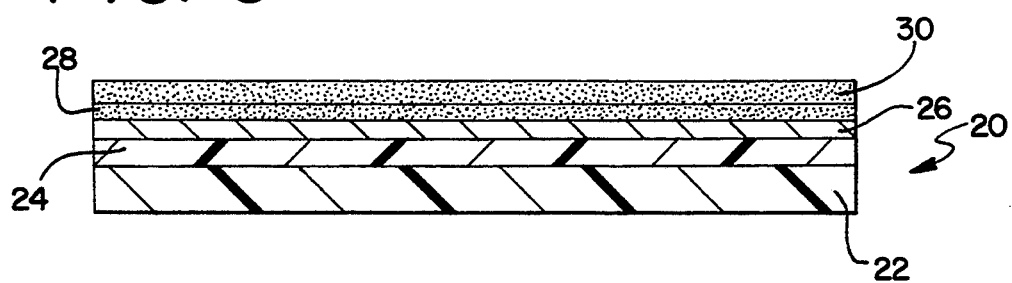
FIG. 3 is a side view of a holographic thermal transfer ribbon in accordance with Example 3 of the invention, starting with a conventional holographic hotstamp foil, the holographic hot-stamp foil having both a foil layer and a heat-sealing layer, and in which a supplemental polymer layer is overlaid upon the heat-sealing layer side of the holographic hot-stamp foil.
Figure 4:
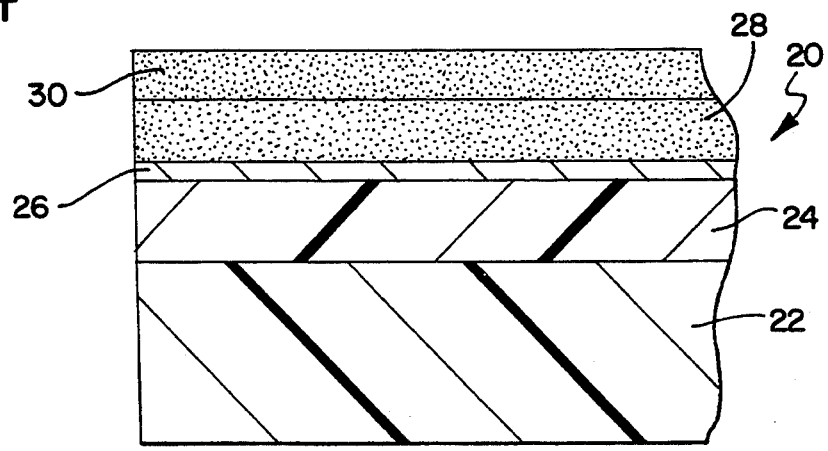
FIG. 4 is an enlarged view of the holographic thermal transfer ribbon of FIG. 3.

The finished holographic thermal transfer ribbon is shown in FIGS. 3 and 4. FIGS. 3 and 4 depict a five-layer structure. The lowest four of these five layers were parts of and obtained from the original, standard holographic hot-stamp foil. The uppermost layer of these five layers was obtained from the Epon 1001F/toluene/EGMS blend coating solution.

FIGS. 3 and 4 show the holographic thermal transfer ribbon 20 of this Example 3. The lowermost layer is obtained from the standard holographic hot-stamp foil, and comprises a relatively thick carrier film 22. Above this carrier film 22 is an embossed polymer 24 upon which the holographic image is generally placed. A foil or metallization layer 26 is secured to the embossed polymer layer 24. Finally, a hot-stamp adhesive comprises the heat-sealing layer 28, and this heat-sealing layer is the last component of this transfer ribbon 20 that is derived from the standard holographic hot-stamp foil. As explained above, a transfer adhesive which comprises an Epon 1001F/toluene/EGMS blend is then rolled onto the hot-stamp adhesive layer 28. This blend dries to form a thermoplastic transfer adhesive layer, i.e, a polymer layer 30.

The resulting finished holographic thermal transfer ribbon of this Example 3 is now ready to be used with the ZEBRA-130 printer in the same manner as the finished holographic thermal transfer ribbon of Example 1. Particularly, the hologram from this holographic thermal transfer ribbon is applied by installing it on the upper, or ribbon, capstan of the ZEBRA-130 printer. The substrate on which the hologram is to be placed is secured to the lower, or substrate, capstan. The heat-sealing side of the foil, which now includes the Epon 1001F/EGMS coating, is positioned to face the substrate. The printer head is closed.

The holographic thermal transfer foil has been thickened by the addition of the layer of Epon 1001F/EGMS coating. In addition, the foil and its inherent carrier film are also somewhat heat resistant. As a result, the ZEBRA-130 printer controls are set at a hotter setting, the direct thermal setting, and a burn setting of 5, at a speed of 3 inches per second. The holograms from the holographic thermal transfer foil are then printed sequentially onto the substrates.

EXAMPLE 4

In this Example, the holographic hot-stamp foil was custom-ordered. This custom holographic hot-stamp foil was essentially identical to those used in the above Example 3, except it was provided without the hot-stamp or heat-sensitive adhesive coating that is normally used to enable the hologram to be adhered to a substrate, i.e., applied by hot foil stamping. Thus, it is not technically a true holographic hot-stamp foil. The thermoplastic polymer/solvent coatings of the above Examples worked well with this custom holographic hot-stamp foil. Transfer, however, was more efficient when a rosin tackifier, for example, the low melt polymer Nevtac 80 available from Neville Resin, was added to the Epon 1001F/toluene blend.

A 50 percent solid coating solution was made by dissolving 1 part of an 80/20 (wt.) Epon 1001F/Nevtac blend in 1 part (wt.) toluene. In other words, 8 parts of Epon 1001F and 2 parts Nevtac 80 may be dissolved in 10 parts toluene.

This coating solution may be applied to the custom holographic hot-stamp foil by an offset gravure method using a 165-screen cylinder and a rubber applicator. The coated, custom holographic hot-stamp foil is heated to dry the coating and remove the toluene solvent. In this way, a coated weight of 1.00 to 2.00 pounds per ream is achieved.

After heating to remove the solvent, the finished holographic thermal transfer ribbon is transferred to a substrate using the ZEBRA-130 printer. Satisfactory transfer onto polyester and paper tag stock substrates was achieved with a direct transfer mode setting and a burn level of 4.

Figure 2:
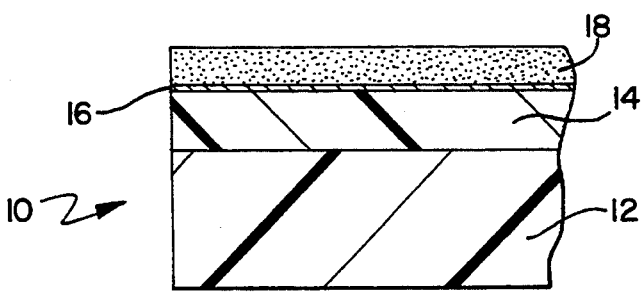
FIG. 2 is an enlarged view of the holographic thermal transfer ribbon of FIG. 1.

The finished holographic thermal transfer ribbon is shown in FIGS. 1 and 2. FIGS. 1 and 2 depict a four-layer structure. The lowest three of these four layers were parts of and obtained from the original, custom holographic hot-stamp foil. The uppermost layer of these four layers was obtained from the 50 percent solid coating solution, i.e., the Epon 1001F/Nevtac coating solution.

FIGS. 1 and 2 show the finished holographic thermal transfer ribbon 10. The lowermost layer is obtained from the custom holographic hot-stamp foil, and comprises a relatively thick carrier film 12. Above this carrier film 12 is an embossed polymer 14 upon which the holographic image is generally placed. A foil, or metallization, layer 16, which is secured to the embossed polymer layer 14, is the last component of this transfer ribbon 10 that is derived from the custom holographic hot-stamp foil. As explained above, a transfer adhesive 18 which comprises an Epon 1001F/Nevtac blend thermoset polymer layer, is then rolled onto the metallization layer 16.

As stated above, the custom holographic hotstamp foil of this Example does not include the standard adhesive or heat-seal coating. This heat-seal coating is normally comprised of a thermoplastic polymer and a filler or pigment, such as calcium carbonate or titanium dioxide. Even after these conventional holographic hot-stamp foils are coated with a coating like that of Example 3, for example, this filler or pigment aids in disrupting the continuity of the adhesive/coating layer. This discontinuity enables the thermally-transferred hologram to break cleanly along precise edges. The resulting holographic image on the substrate is sharp and well-defined.

The custom holographic foil of this Example did not include either the conventional thermoplastic polymer adhesive or the conventional filler or pigment. As a result, there was no means to disrupt the continuity of the adhesive, i.e., the Epon 1001F/Nevtac coating. This, in turn, led to the result that the custom holographic hot-stamp foil, after application of the Epon 1001F/Nevtac coating to form the finished holographic thermal transfer ribbon, frequently did not transfer the hologram in a sharp and well-defined manner.

To improve image transfer resolution, titanium dioxide or calcium carbonate particles may be added to the Epon 1001F/Nevtac solvent blend. In particular, 1 part (wt.) titanium dioxide or calcium carbonate may be added for every 9 parts (wt.) of combined Epon 1001F and Nevtac solids. These inorganic particles must be finely ground and dispersed in the coating solution.

The hologram on the holographic thermal transfer ribbon of this Example was also successfully transferred to a variety of other substrates. These substrates included high density polyethylene, high impact styrene, polyimide films, biaxially oriented polypropylene, coated papers, uncoated papers and paper tag stocks.

EXAMPLE 5

Each of the Examples above called for the application of a coating onto a holographic hot-stamp foil, whether those foils did or did not include their standard thermoplastic adhesive coating. The resulting finished holographic thermal transfer ribbons were then used to place a hologram onto a substrate. In contrast, this Example teaches the application of the coating directly onto the product. Although this method is not preferred, it has been found to be effective and is suitable for special circumstances.

One example of circumstances in which direct coating onto the substrate is preferred is for the so-called registration method. Holographic hot-stamp foil, with or without its standard thermoplastic adhesive coating, is expensive, and this registration method can reduce the amount of foil used by avoiding the need to coat that foil with a thermal transfer adhesive.

Die-cut label stock, such as that used for train tickets, may be used as the substrate. A coating like the coatings described in either Examples 3 or 4 may be applied to the precise portion of the label stock selected to receive the hologram. Application is effected with a flexographic method using a 165-screen cylinder and a rubber applicator. The flexographic printer applies the coating to the substrate as a pattern of intermittent squares, maintaining the location of registration to a particular portion of the die-cut label stock, and applying 1 square per ticket or die-cut label. After application of the coating to form what will be called a coating square, the substrate is oven-dried to eliminate the tackiness of the coating and remove its solvent.

The coated label stock is placed on the lower capstan of the ZEBRA-130 printer with the coated side facing upwardly. The standard or custom holographic hot-stamp foil is placed on the upper capstan, with the heat-seal side of the foil facing the coated surface of the label stock. The print head is then closed, placing the non-shiny side of the holographic hot-stamp foil in direct contact with the coated surface of the label stock.

The ZEBRA-130 printer and the Legitronic computer and its software can be jointly programmed so that the print head electrodes of the ZEBRA-130 printer will be heated only when the single coating square on each ticket or label is aligned with that print head. In this way, a holographic portion of the foil of the same size as that coating square will be transferred, and only when the coating square is aligned with the foil and the print head.

Printers that are generally similar to the ZEBRA-130 printer, such as the ZEBRA-90 printer, may include a foil-saving feature. This feature limits advance of the holographic hot-stamp foil roll during each print cycle. Particularly, this feature limits advance of the foil roll during each cycle to a length corresponding to the length of the hologram to be transferred to the substrate. In this way, usage of the foil is conserved.

EXAMPLE 6

Upon removal of its normal, opaque heat-seal coating, it will be seen that diffraction or holographic patterns from a conventional hot-stamp foil are equally apparent from either side of that foil.

A finished holographic thermal transfer ribbon may be made in another way. First, a thin-gauge, ¼ mil. (0.00025 inches) polyester film was obtained from Toray Plastics as Catalog No. 18GF53N. This film, which is typical of those used to make a thermal transfer ribbon, included a silicone coating on one of its sides. The silicone coating prevents the polyester film from melting onto the print head of the ZEBRA-130 or other similar printers, and also reduces film-print head friction.

Using a 200-screen gravure cylinder, a heat-seal coating comprising 30 percent (wt.) Goodyear 1700 polyester resin and 70 percent tetrahydrofuran is applied in the amount of 0.50 pounds (dry weight solids) per 3000 square feet to the nonsilicone treated side of the polyester film.

After the coating is dried in an oven to remove all of the tetrahydrofuran solvent, the foil side of an adhesive-free holographic foil sheet obtained from TransferPrint Foils, Inc., as Catalog No. CF 100-000-001, was laminated onto the Goodyear 1700 polyester resincoated side of the polyester film. In addition to this foil side, this adhesive-free foil includes a polyester film carrier.

Lamination between the foil side of the foil sheet and the coated polyester film sheet was effected by passing these two sheets between two compression rollers heated to 300° F., or 150° C. After lamination occurs, the foil carrier may be peeled away from the remaining structure. What remains is the holographic foil side of the foil carrier laminated to the coated side of the polyester film.

A thermal transfer adhesive or coating is then coated onto the foil, using a flexographic method, in the amount of 1.00 pound per ream (3,000 square feet). The solids component of this thermal transfer adhesive comprises 9 parts Epon 1001F and 1 part EGMS.

The thus completed holographic thermal transfer ribbon may be placed into the ZEBRA-130 printer, and the hologram from this ribbon transferred to a polyester or paper substrate in the lower thermal transfer mode at a level 3 burn.

This Example demonstrates the advantages of using a thinner carrier. Particularly, such a carrier reduces the thermal energy requirements for transferring the hologram to a substrate.

EXAMPLE 7

A special experimental, partially completed foil was obtained from Crown Roll Co. The film carrier was 0.00075 inches thick with the thermoset coating embossed with a diffractive pattern. The experimental foil was neither metallized, nor did it include a heat sensitive hot stamp adhesive. The thermoset coating in this experimental foil was bonded strongly to the carrier film. Although the thermoset coating has not been metallized, the light scattering properties of the diffractively-embossed surface are readily apparent.

Separately, a metallized paper substrate or a metallized film substrate having reflective properties is coated with a clear or colored, yet transparent, thermoplastic polymer. The metallized paper or film substrates are available from Van Leer Metallized Products and Courtaids Films as Catalog Nos. F143--60# and 11/36365, respectively. The transparent, thermoplastic polymer coatings are preferably made from polyesters, as such polyester-based coatings have been found to readily receive the holographic pattern from the embossed thermoset coating described in the immediately preceding paragraph. A preferred thermoplastic polymer coating is polyester, available from Goodyear Chemical as Catalog No. 1700.

The embossed surface of the embossed thermoset coating is placed on the upper capstan of a ZEBRA-140 printer, and that embossed surface is placed in a face to face relationship with the coated surface of the coated metallized paper or film substrate. The coated substrate is fed by the lower capstan of a ZEBRA-140 printer. Using a direct thermal setting and a level 16 burn, an image is transferred by means of thermal deformation of the substrate coating in contact with the embossed portion of the embossed film image. Although the holographic image is not as distinct as that of the prior Examples, the image is nevertheless diffractive at acute angles to the line of sight and is a mirror image of the original holographic film. The resolution of the image was excellent, and fine details and lines were accurately rendered.

EXAMPLE 8

A standard hot-stamp foil may be modified so that it is compatible with a thermal transfer demand printer. This standard hot-stamp foil is not holographic or diffractive in appearance, but instead has a colored, metallic look, and is without a holographic or diffractive pattern. For example, the foil may be a silver, gold, bronze, copper or other similarly colored foil with a metallic appearance and reflective characteristics.

Suitable foils for this invention are quite amenable to thermal transfer printing, as the foil and adhesive layers are supplied on ½ mil. (0.0005 inches) thick carrier films. In fact, such foils are thinner than holographic foil carriers and slightly thicker than standard thermal transfer ribbons. Because of their thickness, an additional coating is placed on the carrier film. This additional coating provides heat resistance and lubricity as the foil is moved past the thermal print head. Printing can be enhanced by the use of suitable coatings, like those described in the above Example 3, on the heat seal side of the foil.

Suitable standard gold or silver hot-stamp foils are obtained from Astor Universal, Lenexa, Kans., as Catalog Nos. MSG5B07 and MEH5900, respectively. A suitable silicone release coating system may be made from a combination of polymer, catalyst and water. Particularly, 14.1 parts of a Dow Corning polymer Catalog No. 1170 may be added to 1.4 parts of Dow Corning catalyst Catalog No. 1171A and 85 parts water.

A #8 wire wound rod may be used to apply this coating to the foil side of the carrier film. The coated film may then be dried or cured in an oven. The Epon 1001F/toluene/EGMS coating was then applied, as the transfer adhesive, to the heat-sealing layer side of the film, using a #0 rod. Very little of this transfer adhesive need be applied, as the thinner carrier film can more efficiently transfer heat to the print head. Printing can then be effected with the resulting metallic thermal transfer ribbon. In particular, printing with this ribbon can be effected with the Zebra 130 at thermal transfer mode burn level 9, and with the Zebra 140 in the thermal transfer mode at burn level 16.

Accordingly, this Example demonstrates that colored metallic hot-stamp foils, as well as nonmetallic colored hot-stamp foils, may be modified for use on thermal transfer demand printers.

While the specific embodiments have been illustrated and described, numerous modifications come to mind without markedly departing from the spirit of the invention. The scope of protection is, thus, only intended to be limited by the scope of the accompanying claims.

What I claim is:

1. A holographic thermal transfer ribbon for enabling the transfer of a hologram onto a substrate using a thermal transfer demand printer, comprising:
   a. a holographic hot stamp foil, said holographic hot stamp foil having a foil layer side and a heat-sealing layer side;
   b. a supplemental thermoplastic polymer layer overlaid upon the heat-sealing layer side of said holographic hot-stamp foil; and
   c. a silicone layer overlaid on said foil layer side.

2. The holographic thermal transfer ribbon of claim 1, wherein said heat-sealing layer side includes a heat-sensitive adhesive.

3. The holographic thermal transfer ribbon of claim 1, wherein said supplemental polymer layer is placed onto said holographic hot-stamp foil with a thermal transfer ribbon.

4. The holographic thermal transfer ribbon of claim 1, wherein said supplemental polymer layer is placed onto said holographic hot-stamp foil by gravure, flexographic or Meyer rod application of a thermoplastic polymer layer.

5. The holographic thermal transfer ribbon of claim 4, wherein said thermoplastic polymer layer is selected from the group including epoxies, acrylics, polyesters, urethanes, polyethylenes, waxes and rosin tackifiers.

6. A holographic thermal transfer ribbon, said ribbon comprising:
   a. a thin gauge, 25 micron or less polyester film carrier having a silicone coating on one side;
   b. a heat-seal coating applied to the side opposite said silicone coating;
   c. a holographic foil sheet, comprising a carrier film and a foil, laminated onto said heat-seal coated side of said polyester film; and
   d. after removal of said carrier film, a coating of thermal transfer adhesive placed onto said foil.

7. A thermal transfer ribbon, said ribbon comprising a standard hot-stamp foil having a foil side and a heat seal layer side, said hot-stamp foil having a colored, metallic appearance, wherein a silicone release coating system is coated onto said foil side of said standard hot-stamp foil, and a transfer adhesive is coated onto the heat-sealing layer side of said hot-stamp foil.

8. The thermal transfer ribbon of claim 7, wherein said metallic foil is a silver, gold, bronze, or copper foil.

* * * * *

UNITED STATES PATENT AND TRADEMARK OFFICE
CERTIFICATE OF CORRECTION

PATENT NO. : 5,342,672
DATED : August 30, 1994
INVENTOR(S) : Killey

It is certified that error appears in the above-indentified patent and that said Letters Patent is hereby corrected as shown below:

Column 11, line 2, delete "diffractire" and insert --diffractive--

Column 11, line 14, delete "Courtaids" and insert --Courtalds--

Signed and Sealed this

Fourth Day of April, 1995

Attest:

BRUCE LEHMAN

Attesting Officer

Commissioner of Patents and Trademarks